UNITED STATES PATENT OFFICE.

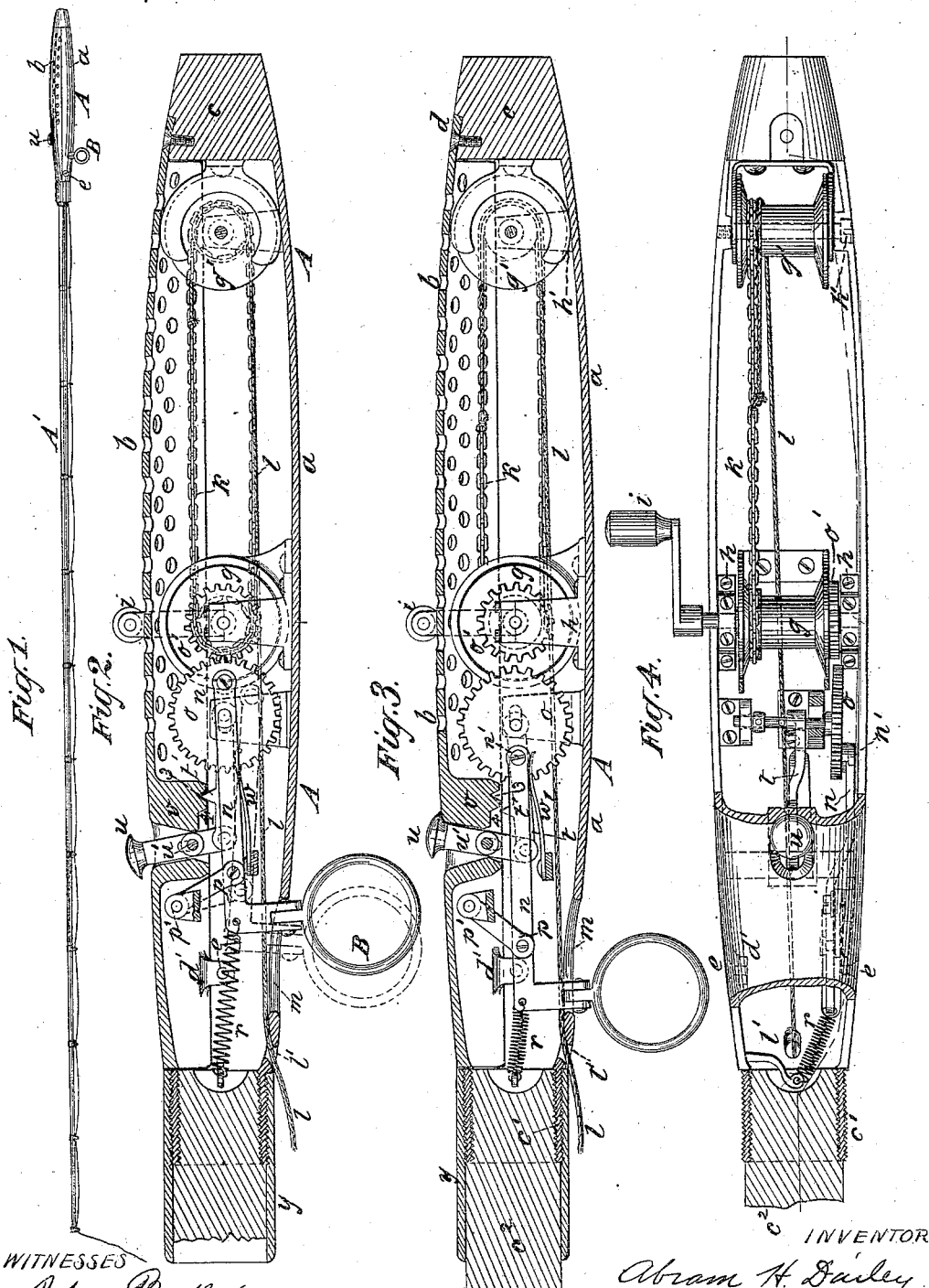

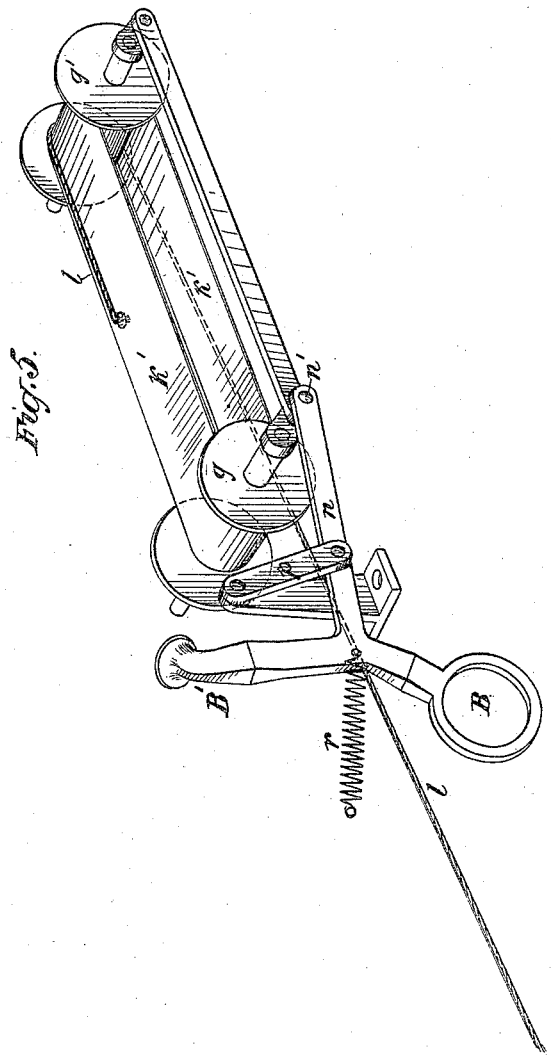

ABRAM H. DAILEY, OF BROOKLYN, NEW YORK.

FISHING ROD AND REEL.

SPECIFICATION forming part of Letters Patent No. 335,797, dated February 9, 1886.

Application filed December 26, 1884. Serial No. 151,272. (No model.)

*To all whom it may concern:*

Be it known that I, ABRAM H. DAILEY, of Brooklyn, Kings county, New York, have invented certain new and useful Improvements in Fishing Rods and Reels, of which the following is a specification.

My invention relates to the special construction of the fish-line reel itself, and also to its special relation with the pole or rod; and the chief object of my invention is to enable the reel to be made in a much more compact form than usual, and yet afford great capacity for line and means for ventilating and drying the wet line when reeled up; and a further important object of my improvement is to enable the reel to be entirely inclosed in the butt of the pole, with the manipulating devices thereof protruding on the exterior.

A still further object is to enable the reel to be readily manipulated and controlled by the simple reciprocation of one finger or thumb without removing the grasp of the hand on the butt of the pole.

To these ends my invention consists, first, in the combination, with the pole having a hollow butt, of a reel inclosed within said butt, and a protruding manipulating device adapted to receive the finger for digital reciprocation, with a mechanical connection between said digital reciprocator and the reel for changing the reciprocation of the manipulator into rotary motion of the reel, whereby the reel may be revolved within the pole by the reciprocation of the finger on the exterior without altering the grasp of the hand on the pole; second, in a reel formed of two bobbins placed at a distance apart and connected by an endless band or chain, to which the end of the line is attached, so that the line becomes wound about both bobbins in the manner of a skein, which presents great advantages, hereinafter set forth.

Further features of my invention lie in a finger or thumb depressing device for throwing the mechanism of the reel into or out of gear, and in other minor details, as hereinafter fully set forth.

In the drawings annexed, Figure 1 shows on a small scale a general external view of a fishing-rod provided with my improvements. Fig. 2 is a longitudinal central section of the butt portion of the rod containing my improved reel and other improvements, the parts being shown "in gear," ready for use. Fig. 3 is a view similar to Fig. 2, with the parts shown "out of gear," to allow the line to run out free. Fig. 4 is a plan view of Fig. 3, with the top of the casing broken away, to show the reel mechanism, &c., within. Fig. 5 is a perspective skeleton view of a modification of the reel mechanism.

In Figs. 1 and 2, A indicates the butt of the rod, and A' the main portion of the rod, which may be made of any of the usual materials and in any of the usual modes, but preferably in sections fitting into each other in the well-known manner. The butt portion A—that is, the portion which is usually grasped by the hand—is, however, made hollow and of perhaps a little larger diameter than usual, and I prefer to make it in a metallic tubular form, of cigar shape, and in two longitudinal or semi-tubular sections, $a$ $b$. The lower section, $a$, is the deeper, and is closed by a solid metal plug or abutment, $c$, at one end, and is formed with a screw-neck, $c'$, at the other end, to receive the first section, $c^2$, of the pole, and also the strengthening-ferrule $y$. The upper lid or cap section, $b$, fits evenly onto the lower section, and has an ear, $d$, at the lower end, which is screwed to the lower abutment, $c$, and also two internal ears, $d'$, at the opposite end, which are screwed to the sides of the lower section, as shown at $e$ $e$ in Figs. 2, 3, and 4. Hence by this construction the cap $b$ may be easily taken off or put onto the lower section, as occasion requires. Now, the reel and its rotating mechanism are inclosed between the two sections of the hollow butt, and are affixed to or supported by the lower or base section, $a$ $a$, as is well shown in Figs. 2, 3, and 4.

The reel consists of two distinct drums or bobbins, $g$ $g'$, placed at a distance apart, the bobbin $g'$ being placed near the lower end of the butt and journaled in the bearings $h'$, fixed to the base-section $a$, while the bobbin $g$ is journaled near the middle of the butt in bearings $h$, also fixed to the base-section $a$, and the shaft of this drum may project exteriorly, as shown, and be provided with the operating-crank $i$. Both drums are mechanically connected within the butt by an endless chain, $k$, which passes around each drum, and is engaged therewith in the manner of chain-wheels, as will be understood. Now, the end of the fish-line $l$ is fastened to this chain $k$, and passes out of the butt through the eye or hole $l'$, and thence runs along the pole through the usual eyes thereof to the end of the pole in the usual manner. It will therefore be seen that if the crank $i$ is rotated both bobbins will be revolved, and the endless chain $k$ will travel with them, and thus wind the line in the manner of a skein around the bobbins; and it will be readily seen that by this system, although each bobbin may be small, yet they are separated a considerable distance, and hence the line will be wound up in long loops skein-like, and therefore a great length of line may thus be extended out in a small space within the butt of an ordinary rod; hence while this reel is of very novel form it has the great advantage that while very compact and capable of being placed within the butt, it has also great capacity, and affords great facility for the drying of the wet line, as the line is much more extended and exposed to the air in this form of reel than with the ordinary circular reel.

In order to facilitate the drying of the line when reeled up, I perforate the cap-section $b$, as fully shown in Figs. 1, 2, and 3, to allow ventilation and circulation of air, and, if preferred, the base-section $a$ may be likewise perforated.

I have described the reel as being operated by the crank $i$; but in practice I prefer to dispense with the crank and employ a digital reciprocating device on the exterior of the butt, so that the reel may be revolved by the to-and-fro movement of one finger without removing the grasp of the hand from the butt of the pole. This digital reciprocating device is indicated at B in Figs. 1, 2, and 3, and is preferably in the form of a ring into which the forefinger can be easily inserted and hooked therein to grasp it for reciprocation. This ring B is connected through a slot, $m$, in the butt with mechanism within the butt for revolving the reel—that is, with any suitable mechanical motion for converting a reciprocating into a rotary motion. Preferably this manipulating device B and its connected mechanism does not act directly on the bobbin $g$ of the reel, but on multiplying-gearing, which engages therewith, so as to impart a multiple motion to the reel.

In the illustration given the ring B is attached to a simple reciprocating bar or connecting-rod, $n$, which connects to a crank-pin, $n'$, on a multiplying gear-wheel, $o$, which meshes with a pinion, $o'$, on the reel-bobbin $g$. This bar $n$ is hung by a link, $p$, from a fixed bridge or ear, $p'$, within the butt, and is thus free to be reciprocated back and forth, and also to be swayed up and down like a lever. A spring, $r$, arranged as fully shown in Figs. 2, 3, and 4, tends constantly to pull the bar and its ring B forward to its limit of movement allowed by the throw of the crank $n'$, as will be readily understood from Figs. 2 and 3. It may now be seen by referring to Fig. 2 that while the hand grasps the butt the forefinger may be inserted in the ring B, and by alternately pulling the ring back by the bending of the finger and allowing it to fly forward by the action of its spring $r$ a smooth rotary motion may be imparted to the wheel $o$, which in turn will revolve the reel $g$ rapidly. It will be also noted that owing to the swaying or lever movement allowed to the bar $n$ and its attached ring B by the pivoted link $p$, the crank cannot become caught on the centers, and hence a smooth and positive rotary motion of the reel is insured by a simple digital reciprocation of the ring B; hence by these means the reel can be easily operated by one finger without removing the grasp of the hand or hands on the butt, as before stated, which is a great advantage over the ordinary crank, which requires one free hand to operate it.

When it is desired to leave the reel free to let the line run out, the multiplying-wheel $o$ may be thrown out of gear, as shown in Figs. 3 and 4. For this purpose the shaft of the wheel $o$ has a slight play in its bearings to and from the pinion $o'$, as fully shown in Fig. 4, and to this shaft is connected an operating-bar, $t$, which is jointed at the opposite end to a small stop or thumb lever, $u$, which projects out through the top side of the butt, and is terminated with a rounded or roughened knob for easy engagement with the tip of the thumb or finger. The stop-lever $u$ is pivoted on a pin, $u'$, which passes through a slot in the hollow neck or socket $v$, which supports the lever and which projects down from the cap-piece $b$ of the butt, as fully shown in Figs. 2 and 3; hence the stop-lever $u$ is capable of being depressed into or projected up out of its socket, and also of being swayed like a lever back or forth, as shown, respectively, in Figs. 3 and 2, and these movements of the stop-lever will correspondingly operate the bar $t$, and thus throw the wheel $o$ into or out of gear, the position of parts when in gear being shown in Fig. 2, and when out of gear in Figs. 3 and 4. The bar $t$ and the stop-lever $u$ are constantly pressed upward by a spring, $w$, and the bar $t$ has a tooth, $t'$, which will engage a notch, 3, on the socket $v$ when the parts are put in gear, as shown in Fig. 2, and thus lock the parts in that position, whereas when the stop $u$ is pressed inward and swayed backward to throw the parts out of gear the tooth $t'$ will engage a second notch, 4, and hold the parts out of gear, as will be readily understood from Figs. 3 and 4; hence by these devices a simple manipulation of the stop $u$ by the tip of the thumb or finger will throw the operating mechanism of the reel into or out of gear, while a simple reciprocation of the finger will revolve the reel as fast as desired, neither of these manipulations requiring that the hand free its grasp on the butt of the pole, which is a great advantage to the fisherman in enabling him to always have the perfect command and easy management of his rod and tackle.

I do not of course confine myself to any exact shape for the digital or manipulating device B, as a ring or any other suitable form for digital grasping or contact may be employed. Neither do I confine myself to any specific mechanical movement between the device B and the reel, as already indicated.

The digital reciprocating device may be formed to be operated either by the thumb or finger, and in Fig. 5 is shown a modification, which may be operated by both thumb and finger, if desired. In this modification the finger-ring B projects downward from the reciprocating bar as before; but there also projects upward from the same bar a thumb-piece or push-button, B', which is designed to protrude from the upper side of the butt, and is terminated with a rounded head adapted for secure contact with the top of the thumb or finger, so that by alternately pressing the push-button down and allowing it to rise by the action of the spring $r$ the bar $n$ will be reciprocated so as to work the crank and revolve the reel. In this modification also the crank is shown directly on the reel $g$, or on the axis thereof, with the bar $n$ connecting directly thereto instead of to an intermediate multiplying-wheel; but in practice I prefer to use the multiplying-wheel previously described.

In Fig. 5 I also show that the two bobbins of the reel may be operatively connected by some positive engagement independent of the endless chain, so that both will revolve in the same direction by power applied to one. In this case cranks and connecting-rods are shown—one set on each side—set at right angles, as indicated in the figure.

Instead of an endless chain for connecting the bobbins, and to which the line is attached, as in the first figures, an endless band, $k'$, the full width of the bobbins or less, as shown in this Fig. 5, may be employed, which band may be made of thin steel or other metal, or of leather, rubber, or any suitable fabric, and it may be engaged either frictionally or positively with the bobbins.

I am aware of the windlass shown in Patent No. 190,594, which is distinct from my reel in that this windlass has two drums over which the rope is wound but not reeled up, the rope being continuously wound on at one end and paid off at the other. In my reel the two drums are connected by an endless band, to which the end of the line is connected, and the line is reeled up cumulatively like a skein over the said band and drums.

I am also aware of the Patent No. 16,626, showing a fishing-rod reel with gearing which may be thrown into or out of mesh; but I lay no claim, broadly, to such gearing, and the said patent is distinct from the special combination and arrangement of parts claimed.

What I claim as my invention is—

1. The combination, with a rotary fish-line reel, of a digital reciprocating device adapted to be manipulated by the thumb or finger without removing the grasp of the hand on the pole, with a suitable mechanical connection between the digital reciprocating device and the reel for converting the reciprocating motion of one into rotary motion of the other, substantially as herein set forth.

2. The combination, with a fishing-rod having a hollow section or butt with a reel inclosed in said section, of a mechanical movement or mechanism connected with said reel for changing reciprocating into rotary motion, and a digital reciprocating device connected with said mechanism and protruding on the exterior of the pole, whereby the reel may be operated within the pole by the movement of the finger or thumb of the hand which grasps the pole.

3. A reel made of two distinct drums or bobbins connected by an endless chain or band to which the end of the line may be attached, whereby the line will become wound about both bobbins in the manner of a skein when the bobbins are revolved, substantially as set forth.

4. The combination, with a fishing-rod having a hollow section or butt with two reel bobbins arranged in said butt, of an endless chain or band connecting them, a line passing into the hollow butt and attached at one end to the chain, and means for revolving said bobbins and thus winding the line skein-like about the bobbins within the said hollow butt, substantially as herein set forth.

5. The combination, with the rotary reel and its driving-pinion $o'$, of the multiplying-wheel $o$, having a play to and from the pinion, with the reciprocating bar $t$ and stop-lever $u$, and a spring-catch for holding said lever and bar in either of two positions, substantially as shown and described.

6. In combination with a fish-line reel, mechanism for revolving the same, consisting of a crank, such as $n'$, operatively connected with said reel, a reciprocating bar, $n$, connected to said crank, link $p$, jointed to said bar, and a spring, $r$, arranged to produce return motion of the parts, with a manipulating device, B, attached to said bar for operating the same by digital reciprocation, substantially as shown and described.

7. The combination, with a fish-line reel and multiplying-gearing actuating the same, of the bar $t$, arranged to throw said mechanism into or out of gear, the stop-lever $u$, connected with said bar, with the spring $w$ and locking-tooth $t'$, and notches 3 4, arranged and operating substantially as set forth.

ABRAM H. DAILEY.

Witnesses:
JNO. E. GAVIN,
CHAS. M. HIGGINS.